Figure 1:
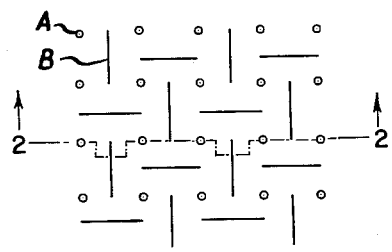

June 6, 1961  N. D. BOYER ET AL  2,987,240

FILM

Filed June 8, 1959

INVENTORS
NOLAN DAVIDSON BOYER
DONALD MACDONALD LEWIS

BY

ATTORNEY

United States Patent Office 2,987,240
Patented June 6, 1961

2,987,240
FILM
Nolan Davidson Boyer and Donald Macdonald Lewis, Wilmington, Del., assignors to E. I. du Pont de Nemours and Company, Wilmington, Del., a corporation of Delaware
Filed June 8, 1959, Ser. No. 818,895
3 Claims. (Cl. 229—87)

This invention relates to film and more particularly to packaging and wrapping film.

Thermoplastic resin films have found wide utility as packaging and wrapping films because of their physical properties such as transparency, flexibility, toughness, strength, chemical stability, non-toxicity and impermeability to liquids and gases. Specific resins suitable for packaging and wrapping film include polyethylene, polypropylene, polyvinylidene chloride, polyesters and similar resins. It has, however, recently become apparent that one of the properties originally believed to be of benefit in these thermoplastic film resins has resulted in fatal accidents involving children, i.e., the suffocation of children entangled in such items as garment bags. The suffocation of children is caused by the gas impermeability of the thermoplastic resin employed as well as the adhesion of the polymer to itself and to the entangled head of the child resulting from inherent limpness of the film and the electrostatic charge on the surface of the film. The puncturing of the film with a regular pattern of holes by itself is of little effect since the wrapping of more than one layer would require the holes to be placed on top of each other, otherwise the electrostatic attraction will seal off the holes and cause suffocation. In order to have the holes placed on top of each other with a high degree of probability a large number of holes of substantial size would be required which would detract substantially from the utility of the film as a packaging material. Furthermore, even a single layer if tightly wrapped around an object would cause the holes to become sealed off due to the adhesion resulting from the electrostatic charge and thus prevent the passage of gaseous material.

It is therefore the principal object of the present invention to provide a film made from suitable thermoplastic resins which allows the passage of gases, such as air, even when wrapped around an object in more than one layer. Other objects include providing a wrapping material which allows the passage of gases and vapors from the wrapped object to the surrounding atmosphere and vice versa and yet retains substantially all of the advantageous physical properties of the unmodified polymer film.

The objects of the present invention are accomplished by a film having a pattern of holes $\frac{1}{64}$ to $\frac{3}{64}$" in diameter placed $\frac{1}{4}$ to $\frac{1}{2}$" apart, said film being embossed with a discontinuous ridge between each of the holes in the polymer film.

In accordance with the present invention it was discovered that a punched film having the pattern of holes and ridges hereinabove defined allows sufficient breathing for a human being even when wrapped around the head of the human being in a double layer. If the size of the hole is varied in proportion with the distance between the perforations a double layer of film allows breathing through the average mouth area on the film without any ill effects.

Although the breathing is more difficult when four layers of the film, made in accordance with the present invention, are placed over the mouth, sufficient air is passed through the film and into the lungs to prevent suffocation. It will be apparent that the ridges embossed on the film are essential in channeling the air between perforations which do not overlap.

A particularly preferred design of perforations comprises a pattern of holes $\frac{1}{32}$" in diameter placed $\frac{3}{8}$" apart. When a film perforated with such a pattern is embossed with discontinuous ridges between the perforations the utility of the film as a wrapping material is substantially retained. Little or no dust penetrates the film, even when employed as a single layer and most liquids run off the film without penetration through the holes in view of the surface tension between liquids and the thermoplastic resin.

Figure 2:
Figure 3:
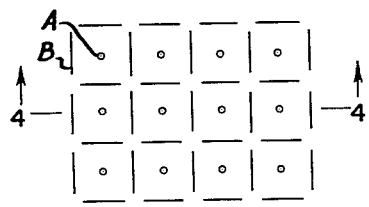
Figure 4:

A more complete understanding of the packaging film of the present invention may be had by reference to the drawing attached hereto and made part of this description. FIGURES 1 and 3 show a top view of the embossed film, FIGURES 2 and 4 give a cross-sectional view of the film taken at 2—2 and 4—4.

Referring to FIGURES 1 and 3 the holes are indicated by A and the ridges by B. FIGURES 1 and 3 show the possible arrangements of the discontinuous ridges and perforations provided in accordance with the present invention. Various other modifications will be apparent. It is, however, essential that discontinuous ridges be embossed between the holes to allow channelling of air from one hole to the next and to maintain the distance between the perforations and the size of the perforations within the limits stated, these limits being so selected as to allow sufficient air to pass through in the average mouth area to prevent suffocation.

Various means may be employed to produce the perforated, embossed film of the present invention. For example the film may be passed continuously through embossing and perforating rolls in line. The embossing of the film may be carried out at room temperature or at elevated temperatures below the melting point if desired.

The film of the present invention is particularly useful in all wrappings employed in the average household. More specifically, one application comprises the use of the films of the present invention in garment bags. The invention is furthermore particularly useful with polyethylene.

We claim:

1. A thermoplastic resin film comprising a film containing circular perforations having diameters from $\frac{1}{64}$ to $\frac{3}{64}$ inch, placed $\frac{1}{4}$ to $\frac{1}{2}$ inch apart, said film being embossed with a discontinuous ridge an equal distance between each of the adjoining perforations.

2. The film as set forth in claim 1 wherein the perforations are $\frac{1}{32}$ inch in diameter and $\frac{3}{8}$ inch apart.

3. The film as set forth in claim 1 wherein the thermoplastic resin is polyethylene.

References Cited in the file of this patent

UNITED STATES PATENTS

| | | |
|---|---|---|
| 383,327 | Starr | May 22, 1888 |
| 1,407,688 | Banton | Feb. 28, 1922 |
| 2,689,678 | Wendt | Sept. 21, 1954 |
| 2,704,099 | Wikle | Mar. 15, 1955 |
| 2,778,173 | Taunton | Jan. 22, 1957 |